Aug. 15, 1961 V. T. TOMBERG 2,995,968
CUMULATIVE ERROR CONTROL DEVICE FOR WEB FEEDING MACHINE
Filed May 21, 1958 3 Sheets-Sheet 1

INVENTOR
VICTOR T. TOMBERG
BY Mock & Blum
ATTORNEYS

INVENTOR
VICTOR T. TOMBERG
BY Mock&Blum
ATTORNEYS

INVENTOR
VICTOR T. TOMBERG
BY Mark T. Basseches
his ATTORNEY

United States Patent Office 2,995,968
Patented Aug. 15, 1961

2,995,968
CUMULATIVE ERROR CONTROL DEVICE FOR WEB FEEDING MACHINE
Victor T. Tomberg, Queens, N.Y., assignor to Topps Chewing Gum, Inc., Brooklyn, N.Y., a corporation of New York
Filed May 21, 1958, Ser. No. 736,847
8 Claims. (Cl. 83—74)

This invention relates to improvements in control mechanism for regulating the length of material cut from a main supply roll. Such a control is commonly called a cut-off register control.

The invention has particular application to certain types of wrapping machines wherein the material, which may be paper, or any other appropriate wrapping material, is fed from a roll and automatically cut to length, the cut-off pieces of material being then used to wrap individual articles such as candy or gum.

The invention also has particular application to other types of machines wherein webs of material are carried by a conveyor, and are subject to repeated actions upon the web. For example, in certain printing presses, a web of material is carried from a roll and a series of successive printing operations on the roll are performed. It is necessary that the printing operations be carried out in perfect registration.

A further particular application of this invention is in the die cutting of cartons. Other applications reside in the field of laminating machines and embossing machines, and there are numerous other applications in which operations must be carried on at accurately selected points upon a moving web of material.

Without limitation thereto, the description which follows is illustratively made with particular reference to the type of wrapping machine wherein the material is fed from a roll and automatically cut to length, but it will be apparent that the invention is not limited to such machine.

In such mechanisms, the wrapping material is fed in web form from a roll toward a cutting station by means of draw rolls and is cut at said cutting station by a knife which moves into cutting position at regulated intervals. Some sort of brake tension is commonly maintained upon the supply roll, in order to keep the web taut.

In such mechanisms, the length of the cut material is commonly regulated by varying the speed of the draw rolls or by varying the speed of movement of the knife. Such control is necessary to compensate for adverse factors, such as draw roll slippage, misprinting, variations in tension upon the web, and the like.

Without limitation, the invention has particular application to a control system whereby a differential transmission is connected between the main drive and the draw rolls and every over-feeding and under-feeding of the web is automatically corrected by actuating the differential transmission and a correction motor in a manner so as to change the speed of rotation of the draw rolls in such a way as to tend to correct the error. Optionally, the speed of the knife, rather than of the draw rolls, may be varied.

Such a differential control mechanism has certain limitations, including slowness of response to errors and relatively small range of correction of errors. It frequently happens that errors in the speed of travel of the web accumulate rapidly and exceed the error range of the automatic control, thereby causing an accumulation of waste material. In this case, a manually operated switch is provided which has to be pulled by the operator of the machine in order to stop the accumulation of waste and to bring the cut-off register control back in its appropriate control range.

An important object of this invention is to provide improved control means which supplement the conventional error control means of the web feeding and cutting system and which automatically keep the cut-off error of the web within the range of the controlling register cut-off mechanism.

In accordance with preferred embodiments of this invention, instead of using a steadily applied mechanical brake upon the supply roll, there is employed an electrically adjustable brake, which may optionally be an eddy current brake, which is responsive to the amount of electric current supplied thereto.

When several errors occur in the same sense in the rate of travel of the web, such as to tend to exceed the range of the cut-off register control or equivalent control mechanism employed, the total of the errors is sensed and means are provided to automatically vary the current supplied to the brake, in response to the accumulation of errors, and thereby vary the braking action upon the supply roll in the proper sense. This produces a relatively large variation in the speed of travel of the web, such as to maintain any error within the range of correction by the cut-off register device or the like.

The invention is not limited to use in conjunction with a brake upon the supply roll. Broadly speaking, in a machine of the type described herein, the speed of the web relative to the speed of the knife and its position relative to the point of cut-off depends upon two mechanical factors, the pulling of the web and the dragging of the web. The pulling is accomplished in the front system of the running web, by means of a draw roller or by means of any other appropriate pulling means. The dragging is accomplished in the back system of the running web, and the drag may make use of either an undriven reel or a driven reel. In the case of the undriven reel, the drag is supplied by means of a brake mechanism. In the case of a driven reel the drag is supplied by means of any approprate driving mechanism, such as a motor or a motor combined with a variable speed drive, which is so adjusted that the speed of the rear wheel is lower than the pulling speed at the front end of the web.

In accordance with the invention, the speed of the web is controlled at both the draw roller or other pull means and at the drag system, whether such drag system be a braked undriven reel or a driven reel driven at lower speed than the pulling speed of the web. These two parts of the system are controlled by a single sensing system including an electric eye. Optionally and preferably, such sensing system operates to correct small errors in speed of the web by applying a correcting factor to the pull system, and operates to correct large cumulative errors in the speed of the web by applying a correction factor to the drag system.

In connection with the control of the drag system, the use of an eddy current electric brake is highly advantageous in that errors due to slippage factors in the brake system are substantially eliminated, thereby simplifying the control of the system as a whole. However, if a driven drag reel is used, then instead of a brake an electrically controlled variable speed drive may be used, and errors due to slippage will still be substantially eliminated.

Other objects and advantages of the invention will become apparent from the following description, in conjunction with the annexed drawings, in which a preferred embodiment of the invention is disclosed.

FIRST EMBODIMENT
*(FIG. 1)*

Figure 1:
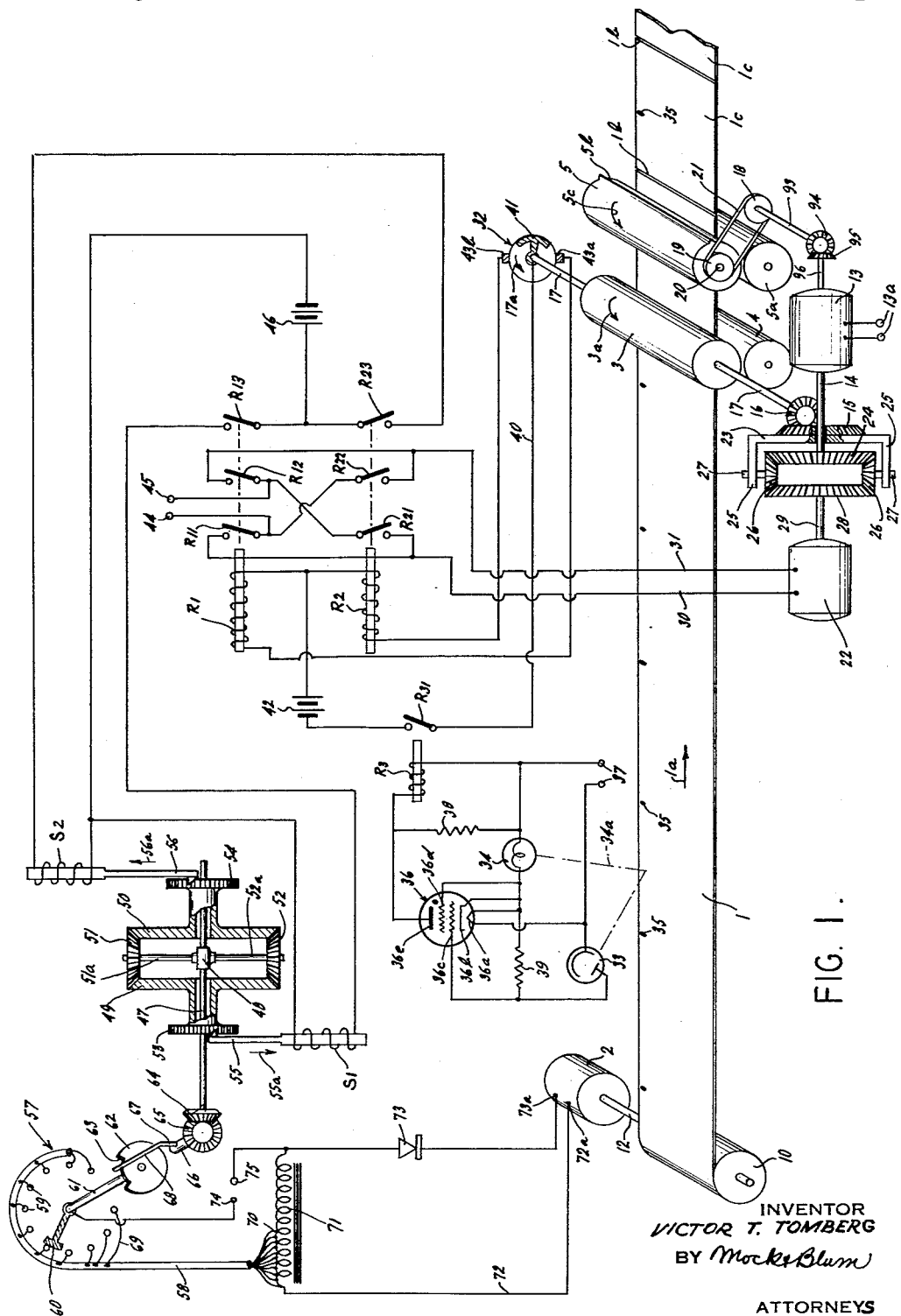
FIG. 1 is a perspective view of a first embodiment of my invention, somewhat diagrammatic in nature and showing schematically the circuit diagram thereof.
Figure 2:
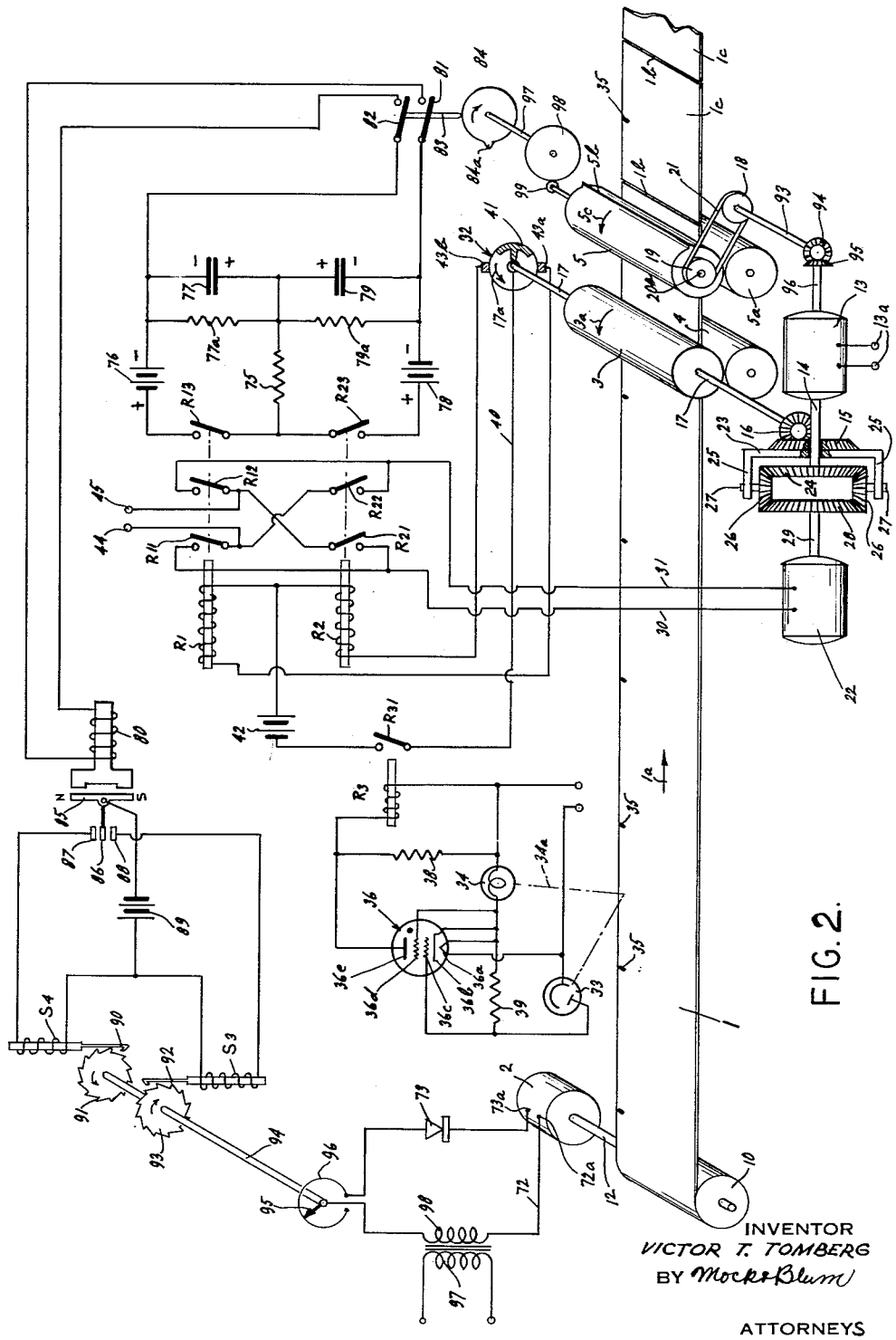
FIG. 2 is a view similar to FIG. 1, showing a second embodiment of my invention.

FIG. 1 shows a web 1 moving in the longitudinal direction from left to right, as shown by arrow 1a. This web 1 may be made of any appropriate material such as paper or foil. Said web 1 is shown as being drawn from a roll 10, mounted upon lateral shaft 12. Said roll 10 corresponds to the tensioning roll used conventionally in connection with apparatus of this type; but as will be hereinafter explained in detail, said roll 10 is not tensioned by a braking belt or the like in the usual manner, but instead is tensioned in a novel manner by means preferably in the form of a variable electrical brake, such as eddy current brake 2, also mounted upon shaft 12 at one side of web 1.

Web 1 may be optionally wound upon roll 10, or may be drawn from another roll, in frictional engagement with roll 10. Since it is not material to the invention which method is employed, the beginning of the web is not shown in the drawing.

Said web 1 is moved by means of draw rollers 3 and 4 and passes between said rollers. Optionally, said roller 4 may be an idler roller and roller 3 may be driven in the direction of arrow 3a.

After passing between rollers 3 and 4, web 1 passes between knife roller 5 and idler roller 5a. Said knife roller 5 has the usual cutting blade 5b. Said roller 5 is driven in the direction of arrow 5c, or in other words, in the same direction as roller 3. Once during each revolution of roller 5, blade 5b makes a cut 1b in web 1, so as to cut said web 1 into successive pieces 1c. By way of example, these pieces 1c may serve as wrappers for candy, gum or the like. Optionally, any other suitable knife, such as a reciprocating knife, may be employed.

In order to drive said rollers 3 and 5, I provide a main drive motor 13 having input terminals 13a which are adapted to be connected to any appropriate source of electric power, optionally and preferably alternating current.

Said motor 13 has a driven shaft 14, upon which bevel gear 15 is mounted. Said bevel gear 15 meshes with a further bevel gear 16 mounted upon shaft 17, and roller 3 is fixedly mounted upon said shaft 17.

Motor 13 has a further driven shaft 96, upon which bevel gear 95 is mounted. Gear 95 meshes with bevel gear 94 mounted upon shaft 93. Pulley 18 is mounted upon shaft 93, and a further pulley 19 is mounted upon shaft 20 of roller 5.

The showing of FIG. 1 is somewhat diagrammatic in nature, and the frame supporting the various shafts and other elements, is omitted.

Means are provided for varying the speed of rotation of roller 3 so as to vary the rate of speed of web 1 in relation to the speed of the knife. This is necessary in order to synchronize the rate of speed of web 1 with the rate of turning of knife roller 5. Such control means include an auxiliary motor 22 and a differential gear mechanism. Said shaft 14 extends to the left of bevel gear 15 and extends turnably through a frame member 23. Bevel gear 24 is mounted upon the left end of shaft 14, to the left of frame member 23. Said frame member 23 has arms 25, and opposing bevel gears 26 are fixed to stub shafts 27 which extend turnably through the respective arms 25. These gears 26 mesh with gear 24.

A further bevel gear 28, which meshes with the two gears 26, is mounted upon the output shaft 29 of motor 22. It will be apparent without further detailed description, that upon the supplying of electrical energy to motor 22, through its input leads 30 and 31, shaft 29 will be turned and the differential gears will turn shaft 14 and hence shaft 17 and roller 3.

Motor 13 is selected with gearing such as to permit advancement or retarding of shaft 14 by motor 22 in favor of or against the turning motion imparted on shaft 14 by motor 22. Motor 22 is selected so as to be responsive to the polarity of the pulses supplied thereto through leads 30 and 31 and so as to turn shaft 29 in respective opposite directions depending upon the polarity of said pulses. Furthermore, motor 22 is selected so as to start almost instantaneously upon the supply of electrical pulses thereto and so as to stop almost instantaneously upon the cessation of said pulses. The details of this speed control system are well known and will not be described in detail.

The control circuit for motor 22 includes selector switch 32, photo-cell 33 and the circuit thereof, relays R1 and R2 and related circuit elements.

Said photo-cell 33 has a lamp 34 as a source of light energy. The light of lamp 34 is directed by any appropriate optical means (not shown) in a beam 34a upon one edge zone of web 1 and is reflected therefrom to photo-cell 33. Said web 1 is provided with the usual spaced index markings 35. These index markings 35 are equally spaced in the direction of movement of web 1 and are located so as to successively change the intensity of light beam 34a, as received by the photo-cell 33.

Any suitable amplification circuit may be employed in conjunction with photo-cell 33 and lamp 34. Optionally, and without limitation thereto, said amplification circuit includes a thyratron tetrode 36, which may optionally be type 2051 tube or the like. Said tube 36 has a heater 36a, cathode 36b, control grid 36c, screen grid 36d and plate 36e.

Said heater 36a is connected in series with lamp 34 and terminals 37, which are adapted to be connected to a source of alternating electrical voltage. Cathode 36b and screen 36d connect with the connection of heater 36a and lamp 34. Plate 36e connects through the coil of alternating current relay R3 and bypass resistance 38, in parallel, to the terminal 37 which is remote from heater 36a.

One terminal of photo-cell 33 and one terminal of resistance 39 are respectively connected to grid 36c. The other terminal of resistance 39 is connected to cathode 36b. The other terminal of photo-cell 33 connects with the terminal 37 which is remote from lamp 34.

When the intensity of light beam 34a is changed by index mark 35, the resulting activation of photo-cell 33 charges the grid 36c and permits thyratron 36 to fire. This causes electric energy to pulse through the coil of relay R3, thereby momentarily closing the normally open contacts of relay switch R31.

The action of the photo-cell circuit is conventional and further description thereof is omitted as unnecessary.

In the description and drawing, the contacts of the coils of relays R1, R2 and R3 are shown diagrammatically as normally open relay switches.

One of the terminals of relay switch R31 connects through line 40 with the movable contact 41 of selector switch 32. The other terminal of relay switch 31 connects with one terminal to a source of electric power which is optionally a source of direct voltage and which is designated by the reference numeral 42.

In the drawing, sources of direct electric voltage are in certain instances designated as batteries, but this is merely for convenience of illustration and any suitable source of direct electric voltage may be employed.

The other terminal of power source 42 connects through the coil of relay R1 to one fixed terminal 43a of selector switch 32, and through the coil of relay R2 to the other fixed terminal 43b of selector switch 32. It will be apparent that the coil of relay R1 is energized when both relay switch R31 is closed and contact 41 engages contact 43a. On the other hand, the coil of relay R2 will be energized when both relay switch R31 is closed and contact 41 electrically engages contact 43b.

Said selector switch 32 is shown somewhat diagrammatically and includes the arcuate above-mentioned movable contact 41 mounted upon shaft 17 of roller 3. The fixed contacts 43a and 43b of switch 42 are diametrically opposed and are peripherally located so as to be successively in electrical contact with the moving contact 41. Contact 41 turns in the direction of arrow 17a.

Optionally, the movement of web 1 is normally such that it moves linearly the distance between successive index markings 35 while knife 5 completes one revolution, so that the length of the cut-piece 1c corresponds to the distance between successive markings 35.

By way of example, the selector switch contact 41 completes one revolution per revolution of knife roller 5. If the contact 41 is located intermediate the fixed contacts 43a and 43b at the time of closing relay switch R31, then neither relay R1 or R2 can be energized. This corresponds to the ideal condition of the system.

As is well known, the speed of web 1 relative to the knife speed can vary for various reasons, including but not limited to slippage relative to the feed rollers 3 and 4. If the speed of travel of web 1 varies from the ideal, then at the instant of closing of relay switch R31, switch contact 41 will not be intermediate the fixed contacts 43a and 43b but will instead engage either one of these contacts. As a result, the corresponding relay R1 or R2 will be energized.

Terminals 44 and 45 are adapted to be connected to an appropriate source of power, to supply the input lines 30 and 31 of motor 22.

Terminal 44 connects through relay switch R11 of relay R1 to line 30, and line 31 connects through relay switch R12 of relay R1 to line 45. On the other hand, line 45 connects through relay switch R21 of relay R2 to line 30, and line 31 connects through relay switch R22 of relay R2 to line 44. As a result, the polarity of the voltage applied to lines 30 and 31 when relay R2 is energized is the reverse of the polarity when relay R1 is energized.

Motor 22 is selected so as to turn in a direction corresponding to the polarity or phase of the voltage applied thereto, from which it follows that the direction of turning of shaft 29 is dependent upon whether switch contact 41 engages contact 43a or contact 43b simultaneously with the closing of relay switch R31. The direction of turning of motor 22, corresponding to the polarity or phase of the voltage pulse applied thereto, is chosen so as to turn roller 3 and switch contact 41 so as to speed up or slow down the web, whichever is necessary to adjust the movement of movable switch contact 41.

Further details as to the register control system as thus far described, are omitted because in its general aspects, this system is conventional.

In practice, frequently there is an accumulation of errors in the same sense in rate of travel of web 1, such accumulation of errors being sufficiently rapid and of sufficient magnitude as to go beyond the range of correction of the differential mechanism controlled by selector switch 41. An important feature of this invention is the provision of automatic means, including the aforementioned eddy current brake 2, for sensing an accumulation of errors in rate of travel of web 1 and for supplying corresponding braking correction of roll 10, so as to reduce the error in rate of travel of web 1 and thereby keep the error within the range of correction by the cut-off register control.

Said range control means optionally include a further relay switch R13 of relay R1 and a further relay switch R23 of relay R2. Said relay switches R13 and R23 have a common connection with on terminal of a source of direct voltage 46. The other terminal of voltage source 46 connects respectively with one terminal of solenoid S1 and one terminal of solenoid S2. The other terminal of solenoid S1 connects with the terminal of relay switch R13 which is remote from voltage source 46. The other terminal of solenoid S2 connects with the terminal of relay switch R23 which is remote from voltage source 46. Said solenoids S1 and S2 control the operation of a differential mechanism.

Said differential mechanism is conventional and includes shaft 47 journaled in bearing mechanism 48. Bevel gears 49 and 50 are turnably mounted upon shaft 47. Said bevel gears 49 and 50 respectively mesh with further bevel gears 51 and 52 which are in turn turnably mounted upon shafts 51a and 52a. These shafts 51a and 52a are mounted in mechanism 48.

Outwardly of gears 49 and 50, further gears 53 and 54 are respectively turnably mounted upon shaft 47 and are preferably fixed to gears 49 and 50 respectively, by any suitable means.

The core of solenoid S2 connects with a ratchet 56 which meshes with the teeth of gear 54. The core of solenoid S1 connects with a ratchet 55 which means with the teeth of gear 53. Said ratchets 55 and 56 are oppositely oriented, as shown in the drawing, and are adapted to be drawn in respective operating strokes in the respective direction of arrows 55a and 56a upon energization of respective solenoids S1 and S2. As a result, shaft 47 can be turned a selected portion of a revolution in a selected sense, depending upon which solenoid S1 or S2 is energized. The turning of shaft 47 controls the operation of rotary switch 57. This switch 57, which is shown somewhat diagrammatically, has a plurality of spaced fixed contacts 59, as well as a rotary contact element 60 mounted upon shaft 61. A disc 62 is mounted upon the outer end of shaft 61 and has an arcuate peripheral notch 63. A bevel gear 64 upon the end of shaft 47 meshes with a further bevel gear 65 mounted upon shaft 66. Rod 67 extends radially outwardly from shaft 66 and is then turned at right angles to provide a rod 68 which extends into notch 63.

Notch 63 is optionally wide enough to permit a certain amount of play of rod 68 therein. However, upon sufficient rotation of shaft 47, rod 68 is turned and strikes one of the edges of notch 63 so as to turn contact element 60 in a direction corresponding to the direction of turning of shaft 47, thereby bringing element 60 into engagement with a different contact 59.

Respective leads 69 of cable 58 connect from the respective switch terminals 59 to respective terminals 70 of variable auto transformer 71. One end of transformer 71 connects through line 72 to terminal 72a of eddy current brake 2. The other terminal of transformer 71 connects through rectifier 73 to the other terminal 73a of eddy current brake 2.

Terminals 74 and 75, which are adapted to be connected to any suitable source of alternating voltage, are respectively connected to contact element 60 and to the same end of transformer 71 to which rectifier 73 is connected. From this, it will be apparent that rectified current is supplied to eddy current brake 2 at a voltage depending upon the setting of contact element 60. Optionally, any other suitable means of varying a direct voltage supply to eddy current brake 2 as the result of the movement of disc 62, may be utilized.

SUMMARY OF OPERATION

If the machine is working properly, the current in eddy current brake 2 and the speed of turning of draw roll 3 is such that the distance between cuts 1b in web 1 is equal to the distance between successive marks 35. Also, switch element 41 is intermediate contacts 43a and 43b when tube 36 fires.

If the movement of web 1 is retarded, by way of illustration, element 41 makes contact with contact 43b when tube 36 fires. Relays R3 and R1 are simultaneously energized, and terminal 44 is connected to terminal 30 and terminal 45 to terminal 31. Also, solenoid S2 is energized. A voltage pulse is supplied to motor 22 in such a way as to tend to speed up draw roller 3. Also, rod 68 is moved slightly toward one end of notch 63.

As further deviations occur, the cut-off register control acts to correct them in similar manner. However, if the cumulative excess of deviations in either direction becomes sufficiently great, the correction response being too slow (for example, if a sudden large slippage of the web takes place), then rod 68 bears against one of the edges of disc 62 and actually turns it, thereby changing the setting of switch 57 and varying the voltage supplied to eddy current brake 2. This varies the braking action upon shaft 12 and brake 10, the relationship of the auto transformer and switch 57 to the other parts being such that the resulting variation in speed of web 2 is such as to tend to compensate for the aforesaid cumulative excess of deviations. The compensation in web speed produced by switch 57 is greater than the correction produced by motor 22, but less than the cumulative excess of deviations which caused the change in setting of switch 57 in the first place. As a result, the speed of movement of the web is never beyond the control capacity of the machine, and an expensive and precise register cut-off control is not needed.

Figure 3:
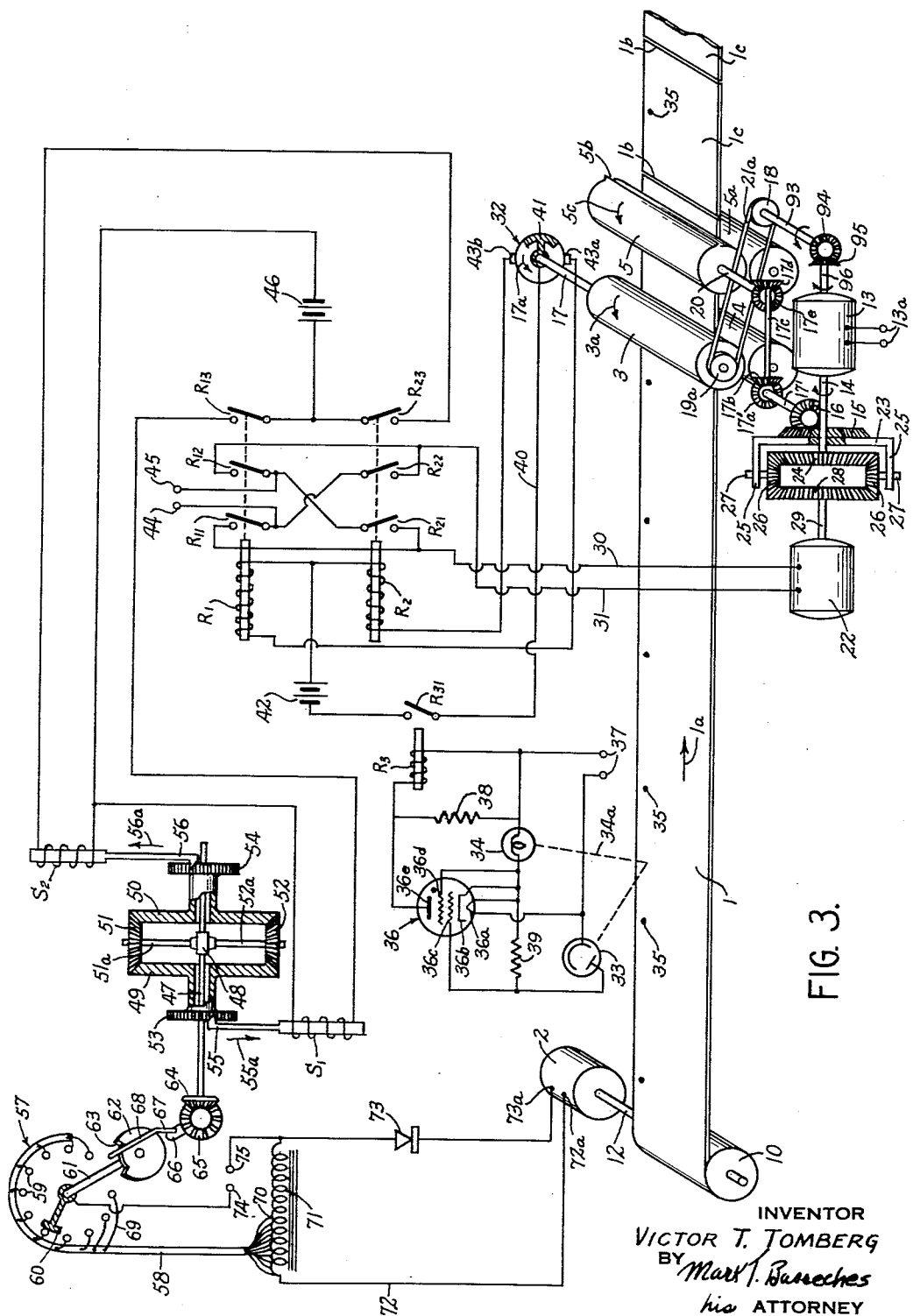
FIGURE 3 is a view similar to FIG. 1 showing modifications to the embodiment of FIG. 1.

In FIGURE 3 there is shown an embodiment similar in all respects to FIGURE 1 except that small corrections are effected by applying a correction to the knife roller 5 rather than to the drive roller 3.

To effect the change aforesaid, it is merely necessary to drive knife roller 5 from shaft 17, which incorporates error corrections introduced by motor 22 and to drive drive roller 3 from shaft 93, which turns at a speed which is a function of the speed of motor 13.

For this purpose, roller 3 is provided with a pulley 19a, which is linked to pulley 18 of shaft 93 by belt 21a. Similarly, shaft 17' leading from the differential drives shaft 20 of knife roller 5 through meshed bevel gears 17'a carried by shaft 17', and 17b of cross shaft 17c, the shaft 17c being linked to shaft 20 by meshed bevel gears 17d and 17e carried by shafts 17c and 20, respectively.

As noted in the description of the first embodiment wherein minor corrections were applied to drive roller 3, motor 22 would increase the speed of roller 3 to correct for minor lagging errors and decrease the speed of roller 3 to correct for minor leading errors of said web.

Where the correction is applied through the knife roller 5, the correction applied to such roller obviously must be in the same sense as the error detected and thus a lagging web should be corrected by decreasing, and a leading web corrected by increasing the speed of roller 5. This difference is effected, as shown in FIGURE 3, by reversing the leads 30, 31 to motor 22, thereby inducing a correction in the knife roller 5 in the same sense as the detected error.

SECOND EMBODIMENT (FIG. 2)

In the two embodiments, like numbers refer to like parts. Accordingly, it will be apparent that the only differences are in the cumulative error sensing and control system.

In the second embodiment, the circuit of relay switches R13 and R23 is varied. Relay switches R13 and R23 have respective terminals which connect to common line resistor 75. The other terminal of switch R13 connects through direct voltage source 76 and condenser 77 to resistor 75. The other terminal of switch R23 connects through direct voltage source 78 and condenser 79 to resistor 75. Resistances 77a and 79a are respectively connected across condensers 77 and 79. The respective polarities of voltage sources 76 and 78 are indicated in the drawing and are shown to be in opposition to each other.

One terminal of differential relay 80 connects through switch 82 to the junction between condenser 77 and voltage source 76. The other terminal of differential relay 80 connects through switch 81 to the junction between condenser 79 and voltage source 78. Said switches 81 and 82 are normally open and are actuated by a common lever 83 which is shown diagrammatically and which is controlled by cam 84. Cam 84 carries a projection 84a which strikes lever 83 and moves switches 81 and 82 to closed positions once during a revolution of cam 84. In order to drive cam 84, shaft 20a, which carries roller 5 and which is turned at uniform speed, is provided with gear 99 mounted on the end thereof. Said gear 99 meshes with a larger gear 98 mounted upon one end of shaft 97, cam 84 being mounted upon the other end of shaft 97. By way of illustration, gears 99 and 98 may have a 1:5 ratio, so that switches 81 and 82 are closed once per five revolutions of knife 5.

Said differential relay 80 includes a magnetically polarized contact lever 85 whose contact 86 engages either contact 87 or contact 88, depending upon the polarity of the voltage supplied to relay 80. A further direct voltage source 89 connects between contact 86 and respective terminals of solenoids S3 and S4. The other terminal of solenoid S4 connects with contact 87, and the other terminal of solenoid S3 connects with contact 88.

Solenoid S4 controls a ratchet 90 which meshes with gear 91, and solenoid S3 controls a ratchet 92 which meshes in the opposite sense with gear 93, both of said gears 91 and 93 being mounted upon a common shaft 94. Said shaft 94 carries the movable contact 95 of a circular rheostat 96. The fixed terminal of rheostat 96 is connected through rectifier 97 to one terminal 73a of eddy current brake 2. The movable contact 95 of rheostat 96 is connected through transformer secondary 98 to the other terminal 72a of eddy current brake 2. The transformer primary 97 is adapted to be connected to any suitable source of alternating voltage.

In operation, if selector switch contact 41 is intermediate contacts 43a and 43b when tube 36 fires, relays R1 and R2 are not energized and switches 81 and 82 are open. However, if contact 41 closes with either of contacts 43a and 43b when tube 36 fires, switches 81 and 82 are closed simultaneously with the energization of relay R1 or R2, as the case may be. If relay R1 is energized, by way of example, a correction voltage pulse is supplied to motor 22, as previously described. Also, relay switch R13 is closed for a short interval of time. A voltage pulse is thereby supplied to condenser 77 by voltage source 76. The values of the resistances in circuit with condensers 77 and 79 are chosen in such a way that they hold their charge at least during a time period corresponding to several revolutions (for example, five revolutions) of knife roller 5.

During the time that switches 82 and 83 are open, condensers 77 and 79 respectively build up a charge depending upon the number of electrical pulses which they receive. The accumulated resultant of the opposing charges of condensers 77 and 79 is regularly discharged through relay 80, whenever switches 81 and 82 are closed. If the accumulated resultant charge of condensers 77 and 79 exceeds a selected value, relay 80 is energized sufficiently so as to close contact 86 with either of contacts 87 or 88, depending upon the polarity of the current through relay 80. The resulting stroke of the corresponding ratchet 90 or 92 moves rheostat contact 95 so as to vary the voltage to brake 2, thereby correcting the speed of travel of web 1.

While I have disclosed a preferred embodiment of my invention, and have indicated various changes, omissions and additions which may be made therein, it will be apparent that various other changes, omissions and additions may be made therein, without departing from the scope and spirit thereof.

I claim:
1. Web feeding apparatus comprising friction means for drawing a web in a linear direction, means for detecting small variations in the speed of movement of said web from a selected rate of speed in either sense, means responsive to said detecting means for varying said drawing means to correct the speed of movement of said web, and a cumulative error control device comprising means responsive to a selected cumulative variation in either sense from said selected rate of movement of said web, said cumulative variation being greater than the small variation to which said detecting means are responsive, and further means including variable web drag means responsive to said means responsive to said selected cumulative variation for correcting the rate of movement of said web in an amount less than said cumulative variation from selected rate of movement and greater than the amount of correction caused by said first-mentioned speed correction means.

2. Web feeding apparatus comprising friction means for drawing a web in a linear direction, variable drag means adapted to act upon said web to resist the movement thereof, means for varying said drag means, means for detecting small variations in the speed of movement of said web from a selected rate of speed in either sense, means responsive to said detecting means and adapted to act upon said friction drawing means to correct the speed of movement of said web, means responsive to a selected cumulative variation in either sense from said selected rate of movement of said web, and further means responsive to said means responsive to said selected cumulative variation and adapted to actuate said drag control means so as to vary the drag action on said web in a manner to correct the speed of movement of said web.

3. Web feeding apparatus comprising friction means for drawing a web in a linear direction, drag means for said web to exert drag tension thereon against the force exerted thereon by said friction drawing means, control means for said drag means, means for detecting small variations in the speed of movement of said web both above and below a selected rate of speed, means including a first relay responsive to said detecting means for increasing the speed of movement of said web when its speed is detected to be below a selected lower limit, means including a second relay for decreasing the speed of movement of said web when its speed is detected to be above a selected upper limit, means including said first relay and said second relay for recording the sum of an accumulation of errors in the rate of movement of said web, and means coupling said recording means and said drag control means and responsive to a selected sum of error accumulation in either sense to apply an appropriate correction to the drag action upon said web.

4. Web feeding apparatus comprising friction means for drawing a web in a linear direction, electrical drag means for said web adapted to exert braking tension thereon in proportion to the electric voltage supplied to said drag means and against the force exerted thereon by said friction drawing means, electro-mechanical means for supplying a variable voltage to said drag means and including a turnable arm whose setting determines the amount of voltage supplied to said drag means, means for detecting small variations in the speed of movement of said web both above and below a selected rate of speed, means including a first relay responsive to said detecting means for increasing the speed of movement of said web when its speed is detected to be too slow, means including a second relay for decreasing the speed of movement of said web when its speed is detected to be too fast, means including said first relay and said second relay for recording the sum of an accumulation of errors in the rate of movement of said web, and means coupling said recording means and said arm and responsive to a selected sum or error accumulation in either sense to turn said arm so as to apply an appropriate correction to the drag action upon said web.

5. Web feeding apparatus according to claim 4, said recording means comprising a source of voltage, a first solenoid, and first normally open relay contacts of said first relay connected in series, said recording means also comprising a source of voltage, a second solenoid and second normally open relay contacts of said second relay connected in series, either of said relay contacts being adapted to be closed and the corresponding solenoid to be energized depending upon which relay responds to variation in the speed of movement of said web, said recording means also comprising a differential gear mechanism coupled to the cores of said solenoids and having an output shaft adapted to be turned in either direction depending upon which solenoid is energized, said recording means also comprising a disk mounted upon said turnable arm and having a peripheral notch and a rod coupled to said output shaft and received within the notch of said disk, said notch being wider than said rod and wider than the extent of angular movement of said rod in response to the detection of a single small variation in the speed of movement of said web, said rod being adapted to turn said disk when said rod bears against an end of said notch.

6. Web feeding apparatus according to claim 4, said recording means comprising a first direct voltage source, a first condenser and first normally open relay contacts of said first relay connected in series, said recording means also comprising a second direct voltage source, a second condenser and second normally open relay contacts of said second relay connected in series, each of said relay contacts being adapted to be closed upon energization of its corresponding relay, said recording means also comprising a differential relay and normally open switch means connecting said differential relay across both said first condenser and said second condenser in such a way that the voltage potentials of said condensers oppose each other in said differential relay, means including said detection means for closing said switches whenever a variation in speed of movement of said web is detected, said condensers being adapted to retain a charge thereon and to discharge through said differential relay only when the potential difference between said condensers reaches a selected amount which is greater than the potential across either condenser developed as the result of the detection of a single small variation in the speed of movement of said web, and means responsive to the direction of current in said differential relay to turn said turnable arm.

7. Web feeding apparatus comprising friction means for drawing a web in a linear direction, variable drag means adapted to act upon said web to resist the movement thereof, means for varying said drag means, intermittent means for severing said web laterally of the direction of movement thereof, means for detecting small variations in the speed of movement of said web from a selected rate of speed in either sense, means responsive to said detecting means and adapted to act upon said cutting means so as to vary the speed of action of said cutting means, to regulate the length of strips cut from said web, means responsive to a selected cumulative variation in either sense from said selected rate of movement of said web, and further means responsive to means responsive to said selected cumulative variation and adapted to actuate said drag control means so as to vary the drag action on said web in a manner to correct the speed of movement of said web.

8. Web feeding apparatus comprising friction means for drawing a web in a linear direction, drag means for said web to exert drag tension thereon against the force exerted thereon by said friction drawing means, control means for said drag means, intermittently operable means for cutting said web in a direction crosswise to the direction of movement thereof, means for detecting small variations in the speed of movement of said web both above and below a selected rate of speed, means including a first relay responsive to said detecting means for slowing down the action of said cutting means when the speed of said web is detected to be below a selected lower limit, means including a second relay for speeding up the action of said cutting means when the speed of said web is detected to be above a selected upper limit, means including said first relay and said second relay for recording the sum of an accumulation of errors in the rate of movement of said web, and means coupling said recording means and said drag control means and responsive to a selected sum of error accumulation in either sense to apply an appropriate correction to the drag action upon said web.

References Cited in the file of this patent

UNITED STATES PATENTS

| | | |
|---|---|---|
| 2,052,255 | Shoults | Aug. 25, 1936 |
| 2,576,529 | McKenney et al. | Nov. 27, 1951 |
| 2,840,371 | Frommer | June 24, 1958 |